United States Patent
Ghannam

(10) Patent No.: US 10,533,876 B2
(45) Date of Patent: Jan. 14, 2020

(54) SENSOR ASSEMBLY WITH A COVER FORMING A SPHERICAL JOINT

(71) Applicant: Ford Global Technologies, LLC, Dearborn, MI (US)

(72) Inventor: Mahmoud Yousef Ghannam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 169 days.

(21) Appl. No.: 15/668,731

(22) Filed: Aug. 4, 2017

(65) Prior Publication Data
US 2019/0041234 A1    Feb. 7, 2019

(51) Int. Cl.
| G01D 3/036 | (2006.01) |
| B60S 1/62 | (2006.01) |
| G01D 11/24 | (2006.01) |
| G01D 11/26 | (2006.01) |

(52) U.S. Cl.
CPC .......... *G01D 3/036* (2013.01); *B60S 1/62* (2013.01); *G01D 11/245* (2013.01); *G01D 11/26* (2013.01)

(58) Field of Classification Search
CPC ...... G01D 3/036; G01D 11/245; G01D 11/26; G01J 5/04; G01K 1/14; G01L 19/14; G01P 1/02; G10K 11/004; B60S 1/62; B60S 1/66; B60S 1/68; B60S 1/685; B60S 1/0411; G08B 13/1963
See application file for complete search history.

(56) References Cited

U.S. PATENT DOCUMENTS

| 4,225,881 | A | * | 9/1980 | Tovi | G08B 13/19619 348/151 |
| 4,736,218 | A | * | 4/1988 | Kutman | F16M 11/18 348/143 |
| 5,068,770 | A | * | 11/1991 | Baziuk | B60Q 1/0005 15/250.01 |
| 5,153,623 | A | * | 10/1992 | Bouvier | G08B 13/1963 348/151 |
| 5,315,333 | A |   | 5/1994 | Nash | |
| 6,147,701 | A | * | 11/2000 | Tamura | F16M 11/10 348/143 |
| 6,476,856 | B1 | * | 11/2002 | Zantos | G08B 13/19619 348/143 |

(Continued)

FOREIGN PATENT DOCUMENTS

| GB | 2501500 A | 10/2013 |
| JP | 2006279560 A | 10/2006 |
| KR | 20070034729 A | 3/2007 |

OTHER PUBLICATIONS

"The Worlds Only Patented Self Wiping & Self Cleaning System", © 2016 XSTREAM Designs, http://xstreamdesigns.com/features/self-cleaning/.

*Primary Examiner* — Lisa M Caputo
*Assistant Examiner* — Tran M. Tran
(74) *Attorney, Agent, or Firm* — Frank A. MacKenzie; Bejin Bieneman PLC

(57) ABSTRACT

A sensor assembly includes a base, a sensor attached to the base, and a cover transparent to the sensor and forming a spherical joint with the base. The cover may have a partial spherical shape. The sensor assembly may include an exterior panel having a hole, and the cover may be disposed in the hole. The cover may be rotatable relative to the base about any axis extending parallel to the exterior panel.

20 Claims, 5 Drawing Sheets

(56) References Cited

U.S. PATENT DOCUMENTS

| | | | | |
|---|---|---|---|---|
| 6,527,000 B1* | 3/2003 | Randmae | B08B 3/024 | 134/102.1 |
| 6,678,001 B1* | 1/2004 | Elberbaum | G08B 13/19619 | 348/373 |
| 6,734,914 B1* | 5/2004 | Nishimura | H04N 5/2251 | 348/375 |
| 6,803,738 B2* | 10/2004 | Erten | H02K 41/031 | 310/103 |
| 7,324,152 B2* | 1/2008 | Yoon | H04N 5/2251 | 348/340 |
| 7,446,813 B2* | 11/2008 | Nakamoto | H04N 5/2259 | 348/151 |
| 7,459,834 B2* | 12/2008 | Knowles | H01L 41/0993 | 310/323.02 |
| 7,855,728 B2* | 12/2010 | Aoki | F16M 11/10 | 348/143 |
| 7,909,521 B2* | 3/2011 | Son | G03B 17/00 | 248/181.1 |
| 7,963,707 B2* | 6/2011 | Jung | G03B 17/00 | 396/427 |
| 8,092,101 B2* | 1/2012 | Basho | G03B 27/58 | 396/427 |
| 8,113,907 B2* | 2/2012 | Liu | A63H 3/40 | 396/427 |
| 8,317,414 B2* | 11/2012 | Jones | G03B 17/02 | 396/427 |
| 8,767,120 B2* | 7/2014 | Takizawa | H04N 5/2251 | 348/208.3 |
| 8,899,761 B2 | 12/2014 | Tonar et al. | | |
| 9,278,670 B2* | 3/2016 | Hattori | B60S 1/0848 | |
| 9,380,190 B2* | 6/2016 | Pawlowski | H04N 5/2171 | |
| 9,444,983 B2* | 9/2016 | Liu | H04N 5/2252 | |
| 9,505,382 B2* | 11/2016 | Gokan | B60S 1/0848 | |
| 9,531,934 B2* | 12/2016 | Ma | H04N 5/2258 | |
| 9,731,688 B2* | 8/2017 | Doorley | B60S 1/56 | |
| 9,746,666 B2* | 8/2017 | Eineren | G03B 17/02 | |
| 9,832,354 B2* | 11/2017 | McBride | H04N 5/2252 | |
| 9,989,835 B1* | 6/2018 | Gomez | G03B 17/561 | |
| 10,065,610 B2* | 9/2018 | Wakatsuki | B60S 1/566 | |
| 10,165,164 B2* | 12/2018 | Basho | H04N 5/2251 | |
| 10,179,571 B1* | 1/2019 | Matesic | B60S 1/56 | |
| 10,183,653 B2* | 1/2019 | Davies | B60S 1/56 | |
| 10,220,817 B2* | 3/2019 | Rice | B60S 1/56 | |
| 2008/0072393 A1* | 3/2008 | Tanaka | A47L 1/02 | 15/250.03 |
| 2009/0250533 A1* | 10/2009 | Akiyama | B60S 1/381 | 239/284.1 |
| 2016/0121855 A1 | 5/2016 | Doorley | | |
| 2016/0264064 A1* | 9/2016 | Byrne | B60R 11/04 | |
| 2017/0210351 A1* | 7/2017 | Ghannam | B60S 1/50 | |
| 2017/0349147 A1* | 12/2017 | Blank | B60S 1/56 | |
| 2018/0126921 A1* | 5/2018 | Koseki | B08B 3/02 | |
| 2018/0143298 A1* | 5/2018 | Newman | B62D 15/00 | |

* cited by examiner

SENSOR ASSEMBLY WITH A COVER FORMING A SPHERICAL JOINT

BACKGROUND

Vehicles, such as autonomous vehicles, typically include a variety of sensors. Some sensors detect internal states of the vehicle, for example, wheel speed, wheel orientation, and engine and transmission variables. Some sensors detect the location and/or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices.

DETAILED DESCRIPTION

A sensor assembly includes a base, a sensor attached to the base, and a cover transparent to the sensor and forming a spherical joint with the base.

The cover may have a partial spherical shape. The sensor assembly may include an exterior panel having a hole, and the cover may be disposed in the hole. The cover may be rotatable relative to the base about any axis extending parallel to the exterior panel.

The cover may have a surface feature. The surface feature may be a plurality of dimples. The surface feature may be a fin.

The sensor assembly may include an exterior panel having a hole, and the cover may be disposed in the hole. The sensor assembly may include a wiper extending along an edge of the hole. The wiper may be positioned to maintain contact with the cover as the cover rotates. The cover may have an antiglare coating. The cover may have an exposed portion rotatably positionable in the hole and an unexposed portion not rotatably positionable in the hole, and the exposed portion may have the antiglare coating. The unexposed portion may lack the antiglare coating. The wiper may be blade-shaped. The wiper may be a brush.

The sensor assembly may include a nozzle aimed at the cover. The nozzle may be positioned to cause the cover to rotate when open.

The sensor assembly may include a heating element positioned to apply heat to the cover.

The cover may include a magnetically sensitive element, and the sensor assembly may further include an electromagnet positioned to cause the cover to rotate via the magnetically sensitive element.

A sensor assembly includes a base, a sensor attached to the base, a cover transparent to the sensor and movably coupled to the base, and means for allowing the cover to rotate relative to the base about at least two axes extending transverse to each other.

The cleaning system described herein cleans the cover of a sensor assembly and may thus allow the sensor, after being completely or partly soiled or covered with dirt, water, ice, condensation, etc., to continue to provide useful data and/or to more accurately detect an external environment through which a vehicle moves. Airflow over the cover and movement of the vehicle causes the cover to rotate, and the rotation of the cover removes debris through centrifugal force and through moving the cover against a fixed-position wiper. The cleaning system operates efficiently by allowing airflow and movement of the vehicle to clean the cover, reducing and/or eliminating the need to use liquid and/or compressed gas for cleaning the cover. The cleaning system may also use fewer parts and may only need a simpler control system.

Figure 1:
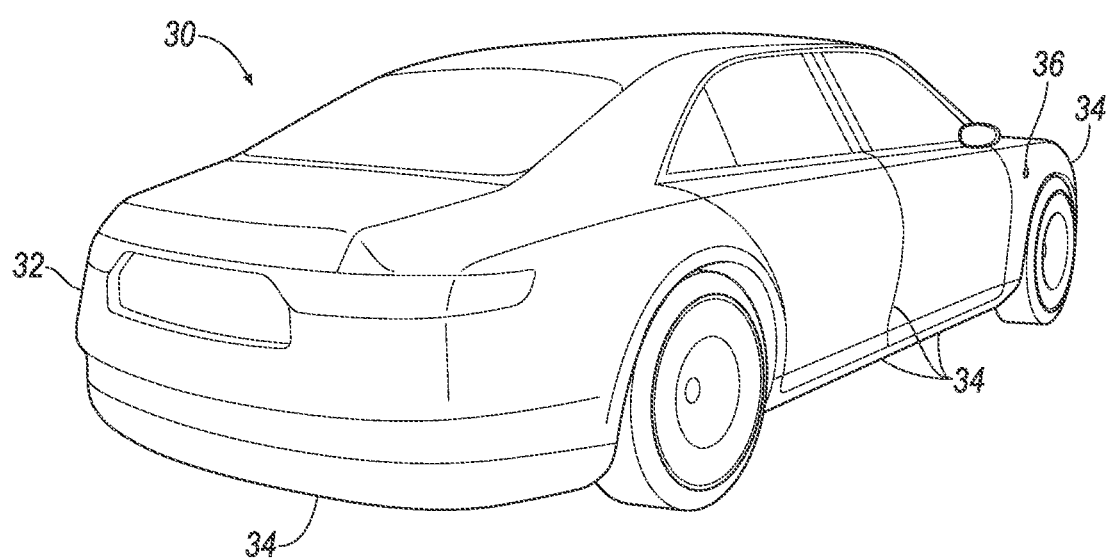
FIG. 1 is a perspective view of a vehicle.

With reference to FIG. 1, a vehicle 30 may be an autonomous vehicle. A computer can be configured to operate the vehicle 30 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

The vehicle 30 includes a body 32. The vehicle 30 may be of a unibody construction, in which a frame and the body 32 of the vehicle 30 are a single component. The vehicle 30 may, alternatively, be of a body-on-frame construction, in which the frame supports the body 32 that is a separate component from the frame. The frame and the body 32 may be formed of any suitable material, for example, steel, aluminum, etc.

Figure 2:
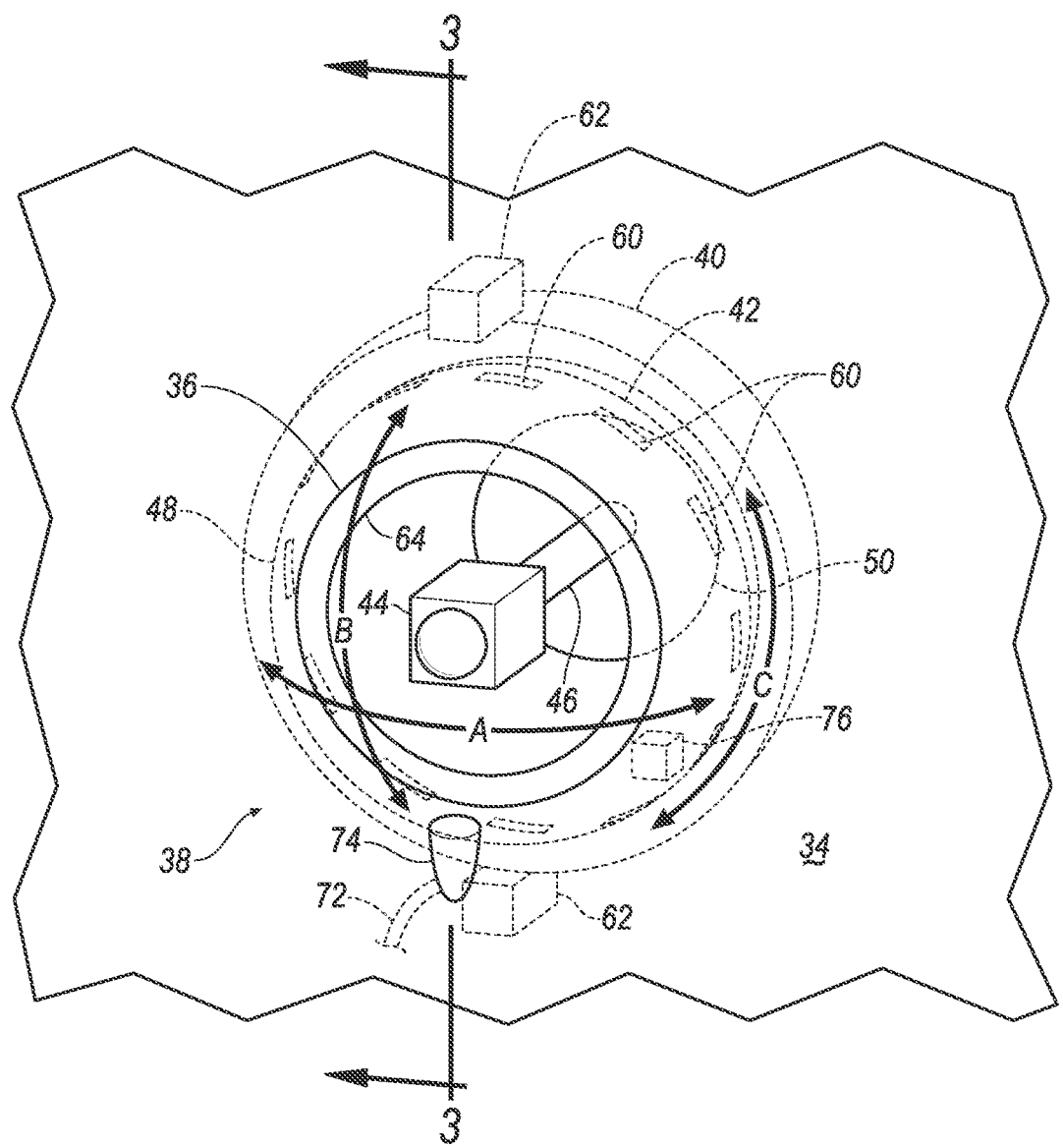
FIG. 2 is perspective view of a sensor assembly of the vehicle.
Figure 3:
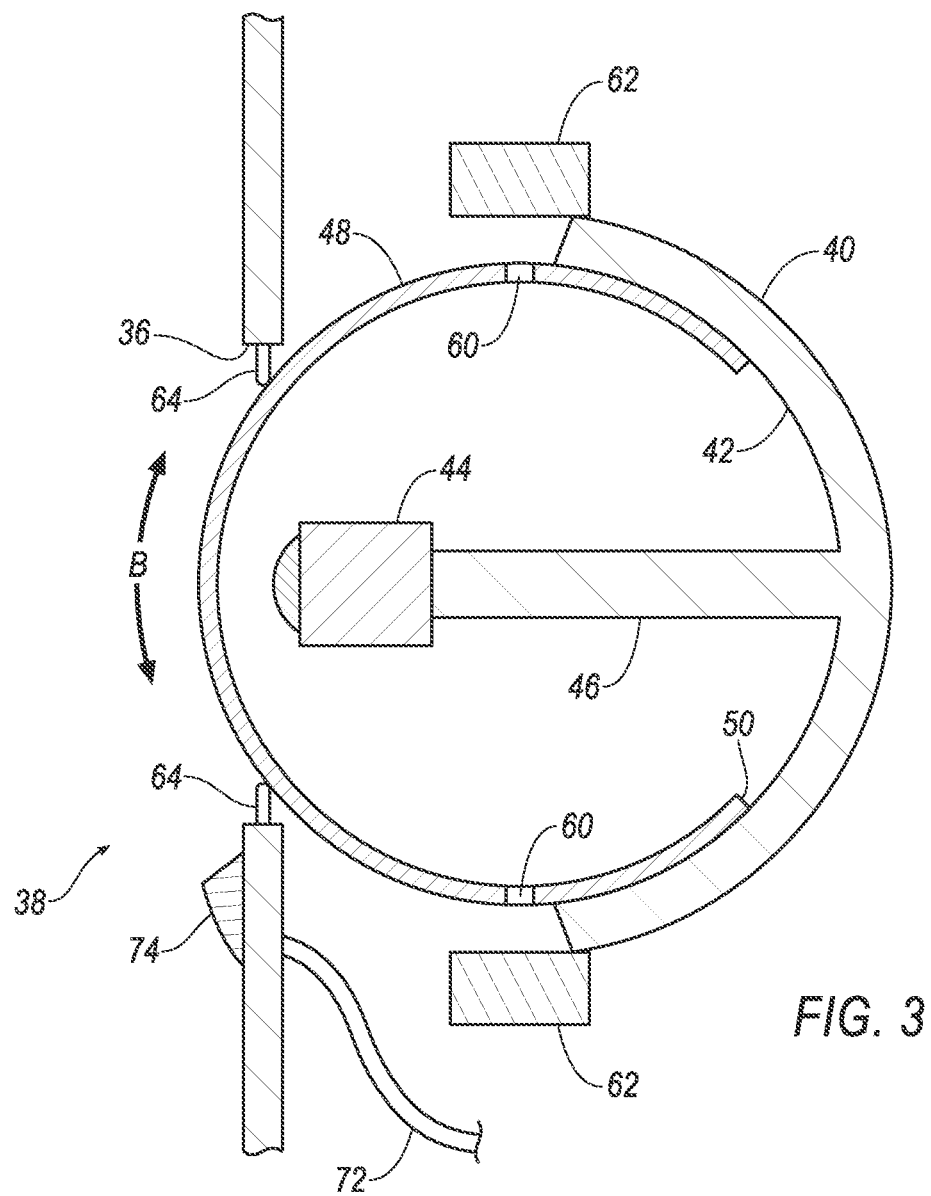
FIG. 3 is a cross-sectional view of the sensor assembly.

With reference to FIGS. 1-3, the body 32 includes a plurality of exterior panels 34. The exterior panels 34 are disposed on an outside of the vehicle 30 and may have a finished outer surface. At least one of the exterior panels 34 has an external hole 36, and a sensor assembly 38 is mounted to that exterior panel 34. The external hole 36 may be circular.

With reference to FIGS. 2 and 3, the sensor assembly 38 includes a base 40 fixed relative to the exterior panel 34 having the external hole 36. In other words, the base 40 is attached directly or indirectly to the exterior panel 34 and does not move relative to the exterior panel 34. The base 40 may include a receiving portion 42 that is partially spherical and concave.

The sensor assembly 38 includes a sensor 44 attached to the base 40. The sensor 44 may be fixed relative to the base 40, i.e., attached directly or indirectly to the base 40 and not movable relative to the base 40. Specifically, the sensor 44 may be attached to the base 40 indirectly via a stopping member 46. The stopping member 46 may extend from the receiving portion 42 of the base 40. The stopping member 46 may be hollow and shield wires, etc. connecting the sensor 44 to other electronics in the vehicle 30.

With continued reference to FIGS. 2 and 3, the sensor 44 may detect the external world. For example, the sensor 44 may be a radar sensor, scanning laser range finder, light detection and ranging (LIDAR) device, or image processing sensor such as a camera. The sensor 44 has a field of view (i.e., the area in which the sensor 44 can detect phenomena such as light, sound, etc.) beginning at and outward from the external hole 36.

With reference to FIGS. 2-5, the sensor assembly 38 includes a cover 48. The cover 48 is disposed in the external hole 36 and in the receiving portion 42 of the base 40. The external hole 36 and the base 40 hold the cover 48 in position. The cover 48 extends around the sensor 44. The cover 48 has a round shape, and the cover 48 may have a partial spherical shape. Specifically, the cover 48 may be shaped like a hollow sphere with a section removed, forming an access hole 50. The stopping member 46 extends through the access hole 50, and the access hole 50 has a longer width or diameter than the stopping member 46.

The sensor assembly 38 has means for allowing the cover 48 to rotate relative to the base 40 about at least two axes extending transverse to each other. The means can include the cover 48 being movably coupled to the base 40. For example, the cover 48 can form a spherical joint with the base 40. That is, the cover 48 forms a ball-and-socket with the receiving portion 42 and the external hole 36. The receiving portion 42 may have a low-friction contact with the cover 48, allowing the cover 48 to freely slide against the receiving portion 42. The cover 48 may rotate against the receiving portion 42 in any direction, such as directions A, B, C shown in FIGS. 2 and 3. In other words, the cover 48 is typically freely rotatable in any direction until an edge of the access hole 50 presses against the stopping member 46. For example, the cover 48 can be rotatable relative to the base 40 about any axis extending parallel to the exterior panel 34 at the external hole 36, such as in directions A and B. The cover 48 may have a range of motion about an axis extending parallel to the exterior panel 34 at the external hole 36, such as directions A and B, so that a portion of the cover 48 exposed in the external hole 36 at one end of the range of motion is completely outside the external hole 36 at the other end of the range of motion. The ends of the range of motion are defined by the edge of the access hole 50 contacting the stopping member 46. For another example, the cover 48 may be rotatable about an axis extending transverse to the exterior panel 34, such as in direction C, about which the cover 48 may have a range of motion of 360° because the edge of the access hole 50 will not contact the stopping member 46 and impede the rotation. Alternatively, the access hole 50 may be noncircular such as slot-shaped, and the cover 48 may be nonspherical but another round shape allowing sliding rotation around more than one axis, for example, a conical shape with a rounded tip.

The field of view of the sensor 44 is directed through the cover 48. The cover 48 is transparent to the sensor 44. Specifically, the cover 48 is transparent with respect to whatever medium the sensor 44 is capable of detecting. For example, if the sensor 44 is a camera, then the cover 48 is transparent with respect to visible light. For another example, if the sensor 44 is a LIDAR device, then the cover 48 is transparent with respect to visible light at the wavelength of the laser pulses generated by the sensor 44.

Figure 4:
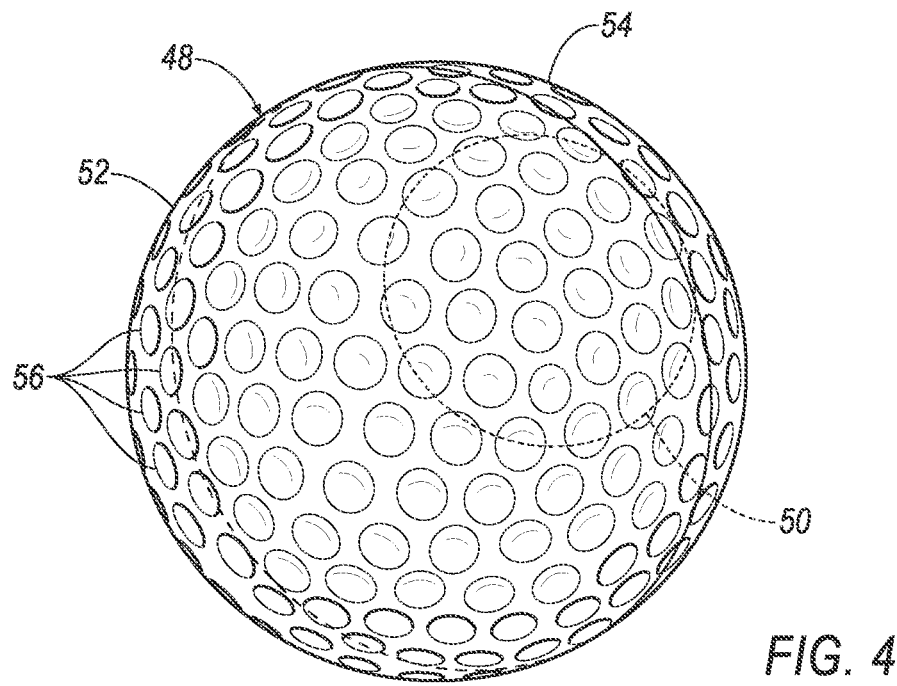
FIG. 4 is a perspective view of an example cover of the sensor assembly.
Figure 5:
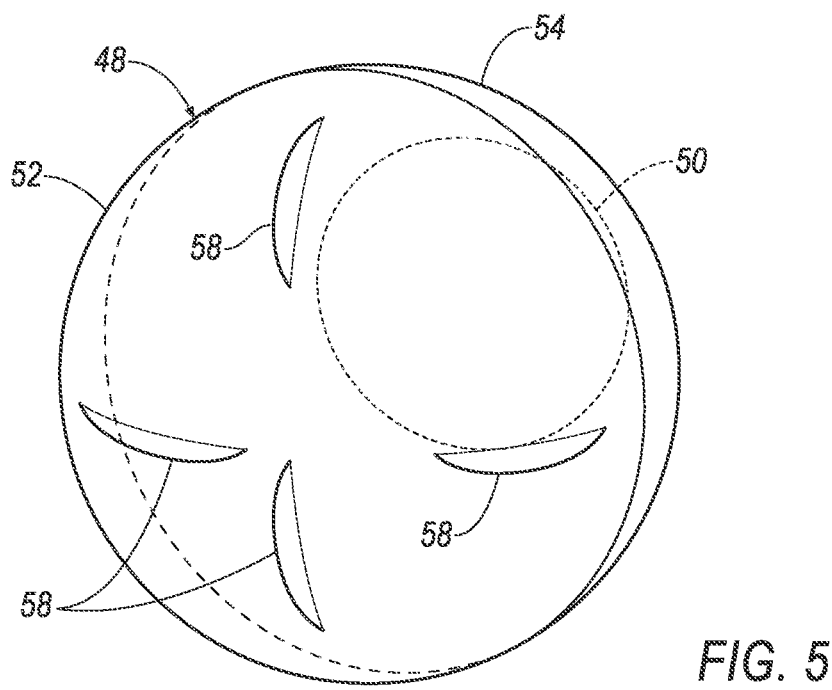
FIG. 5 is a perspective view of another example cover.

With reference to FIGS. 4 and 5, the cover 48 includes an exposed portion 52 rotatably positionable in the external hole 36 and an unexposed portion 54 not rotatably positionable in the external hole 36. "Rotatably positionable, for the purposes of this disclosure, means that for any point in the exposed portion 52, the cover 48 can be moved to a position in which that point is in the external hole 36, e.g., by rotating the cover 48 in the directions A, B, C. Thus, the cover 48 can be positioned so that any point in the exposed portion 52 is in the external hole 36 but cannot be positioned so that any point in the unexposed portion 54 is in the external hole 36.

The cover 48 typically includes an antiglare coating. The antiglare coating may be applied to an entirety of the cover 48. Alternatively, the antiglare coating may be applied to the exposed portion 52 of the cover 48, and the unexposed portion 54 may lack the antiglare coating. The antiglare coating, also called an antireflective coating, is a coating that reduces reflection. For example, the antiglare coating may be formed of alternating transparent thin films with contrasting refractive index.

The cover 48 may include one or more surface features 56, 58. The surface features 56, 58 increase drag experienced by a portion of the cover 48 positioned in the external hole 36. For example, the surface features 56, 58 may be a plurality of dimples 56, as shown in FIG. 4. For another example, the surface features 56, 58 may be fins 58, as shown in FIG. 5. The increased drag may cause the cover 48 to rotate when the vehicle 30 is in motion or when wind blows across the exterior panel 34.

With reference to FIG. 2, the cover 48 may include magnetically sensitive elements 60. The magnetically sensitive elements 60 may be embedded in a wall of the cover 48. The magnetically sensitive elements 60 may be permanent magnets or may be conductors able to carry electrical currents.

The sensor assembly 38 includes an electromagnet 62 positioned to cause the cover 48 to rotate via the magnetically sensitive element. The electromagnet 62 may be attached to and/or fixed relative to the base 40. For example, the electromagnet 62 and the magnetically sensitive elements 60 may function as an electric motor, with the cover 48 having the magnetically sensitive elements 60 acting as a rotor and the electromagnet 62 acting as a stator. The electromagnet 62 may include permanent magnets and/or windings on poles.

With reference to FIGS. 2 and 3, a wiper 64 extends along an edge of the external hole 36. The wiper 64 is fixed to the exterior panel 34. For example, the wiper 64 may be adhered, fastened, etc. to the exterior panel 34 along the edge of the external hole 36. The wiper 64 is stationary and is positioned to maintain contact with the cover 48 as the cover 48 rotates. As the cover 48 rotates, the wiper 64 wipes the cover 48, specifically, the exposed portion 52 of the cover 48. The wiper 64 may be circular and may extend along an entirety of the edge of the external hole 36.

The wiper 64 may be blade-shaped, as shown in FIG. 3. The blade shape of the wiper 64 may be directed at an acute angle to a surface of the cover 48. Alternatively, the wiper 64 may be a brush having bristles. The bristles may be directed toward a center of the external hole 36, perpendicular to the exterior panel 34, toward a center of the cover 48, etc.

Figure 6:
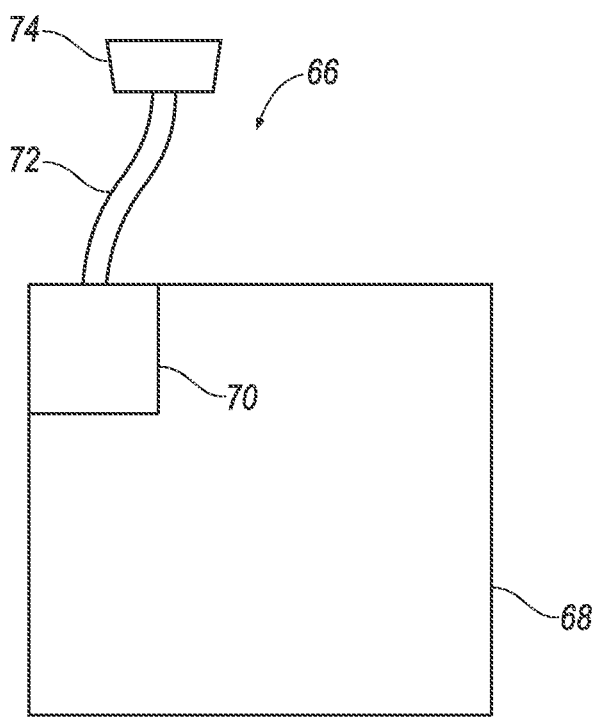
FIG. 6 is a diagram of an example liquid-supply system for the sensor assembly.

With reference to FIG. 6, a fluid system 66 of the vehicle 30 includes a reservoir 68, a pump 70, a supply line 72, and a nozzle 74. The fluid system 66 may distribute washer fluid stored in the reservoir 68 to the nozzle 74. "Washer fluid" refers to any liquid stored in the reservoir 68 for cleaning. The washer fluid may include solvents, detergents, diluents such as water, etc. Alternatively or additionally, the fluid system 66 may distribute compressed air through the nozzle 74.

The reservoir 68 may be a tank fillable with liquid, e.g., washer fluid for window cleaning. The reservoir 68 may be disposed in a front of the vehicle 30, specifically, in an engine compartment forward of a passenger cabin. The reservoir 68 may store the washer fluid only for supplying the sensor assembly 38 or also for other purposes, such as supply to a windshield.

With continued reference to FIG. 6, the pump 70 may force the washer fluid through the supply line 72 to the nozzle 74 with sufficient pressure that the washer fluid sprays from the nozzle 74. The pump 70 is fluidly connected to the reservoir 68. The pump 70 may be attached to or disposed in the reservoir 68.

With reference to FIGS. 2, 3, and 6, the sensor assembly 38 includes at least one nozzle 74. The nozzle 74 is fluidly connected to the pump 70 and/or an air compressor (not shown). The nozzle 74 may be supported by and protrude from the exterior panel 34. For example, the nozzle 74 may be adhered, fastened, etc. to the exterior panel 34, or the nozzle 74 may be friction-fit in a hole or slot through the exterior panel 34. The nozzle 74 may be spaced from the external hole 36. The nozzle 74 is positioned to cause the cover 48 to rotate when open, i.e., when allowing pressurized liquid or compressed air through. The nozzle 74 is aimed at the cover 48. Specifically, the nozzle 74 may be fixedly positioned to eject liquid or compressed air at the cover 48 at an acute angle to the surface of the cover 48. The force and angle of the liquid or air striking the cover 48 may cause the cover 48 to rotate.

With reference to FIG. 2, a heating element 76 may be positioned to apply heat to the cover 48. The heating element 76 may be positioned near the external hole 36. The heating element 76 may be attached and/or fixed relative to the exterior panel 34 or the base 40. The heating element 76 may have a high electrical resistance and produce heat in response to electric current flowing through the heating element 76, i.e., resistive or Joule heating. The heating element 76 may be formed of any material producing sufficient heat in response to electric current, e.g., Kanthal, nichrome, cupronickel, molybdenum disilicide, positive temperature coefficient (PTC) ceramic, etc., or combinations of such materials. The heating element 76 may be shaped to have a high ratio of surface area to volume, such as a coil.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly comprising:
    a base;
    a sensor attached to the base;
    a cover transparent to the sensor and forming a spherical joint with the base;
    a nozzle aimed at the cover and positioned to cause the cover to rotate when allowing pressurized fluid through the nozzle; and
    a pump fluidly connected to the nozzle and able to generate sufficient fluid pressure to cause the cover to rotate when pumping fluid through the nozzle.

2. The sensor assembly of claim 1, wherein the cover has a partial spherical shape.

3. The sensor assembly of claim 2, further comprising an exterior panel having a hole, the cover disposed in the hole.

4. The sensor assembly of claim 3, wherein the cover is rotatable relative to the base about any axis extending parallel to the exterior panel.

5. The sensor assembly of claim 2, wherein the cover has a surface feature.

6. The sensor assembly of claim 5, wherein the surface feature is a plurality of dimples.

7. The sensor assembly of claim 5, wherein the surface feature is a fin.

8. The sensor assembly of claim 1, further comprising an exterior panel having a hole, the cover disposed in the hole.

9. The sensor assembly of claim 8, further comprising a wiper extending along an edge of the hole.

10. The sensor assembly of claim 9, wherein the wiper is positioned to maintain contact with the cover as the cover rotates.

11. The sensor assembly of claim 10, wherein the cover has an antiglare coating.

12. The sensor assembly of claim 11, wherein the cover has an exposed portion rotatably positionable in the hole and an unexposed portion not rotatably positionable in the hole, and the exposed portion has the antiglare coating.

13. The sensor assembly of claim 12, wherein the unexposed portion lacks the antiglare coating.

14. The sensor assembly of claim 10, wherein the wiper is blade-shaped.

15. The sensor assembly of claim 10, wherein the wiper is a brush.

16. The sensor assembly of claim 1, further comprising a heating element positioned to apply heat to the cover.

17. The sensor assembly of claim 1, wherein the nozzle is disposed outside the cover.

18. The sensor assembly of claim 1, wherein the cover is rotatable solely by pressurized fluid delivered through the nozzle.

19. A sensor assembly comprising:
    a base;
    a sensor attached to the base;
    a cover transparent to the sensor and forming a spherical joint with the base, the cover including an access hole; and
    a stopping member fixed relative to and extending from the base through the access hole into the cover to the sensor;
    wherein the cover is freely rotatable in any direction until an edge of the access hole presses against the stopping member.

20. The sensor assembly of claim 19, wherein the cover includes a magnetically sensitive element, the sensor assembly further comprising an electromagnet positioned to cause the cover to rotate via the magnetically sensitive element.

\* \* \* \* \*